United States Patent [19]

Blickstein

[11] Patent Number: 4,845,586
[45] Date of Patent: Jul. 4, 1989

[54] HIGH POWER TUNABLE CAPACITOR

[75] Inventor: Martin J. Blickstein, Alpharetta, Ga.

[73] Assignee: Murata Erie North America, Inc., Smyrna, Ga.

[21] Appl. No.: 173,875

[22] Filed: Mar. 28, 1988

[51] Int. Cl.⁴ .............................................. H01G 5/04
[52] U.S. Cl. ..................................................... 361/292
[58] Field of Search ................................ 361/278, 292

[56] References Cited

U.S. PATENT DOCUMENTS

| | | | |
|---|---|---|---|
| 2,373,140 | 4/1945 | Opperman | 175/41.5 |
| 2,575,199 | 11/1951 | Stott | 178/44 |
| 2,978,638 | 4/1961 | Wing et al. | 324/70 |
| 3,147,374 | 9/1964 | Diamond | 235/189 |
| 3,191,107 | 6/1965 | Mermelstein et al. | 361/278 X |
| 3,270,259 | 8/1966 | Oeschger | 317/243 |
| 4,363,073 | 12/1982 | Tumber | 361/292 |
| 4,459,635 | 7/1984 | Blickstein | 361/293 |

FOREIGN PATENT DOCUMENTS

| | | | |
|---|---|---|---|
| 1005189 | 3/1957 | Fed. Rep. of Germany | 361/292 |
| 1121730 | 1/1962 | Fed. Rep. of Germany | 361/292 |

*Primary Examiner*—Donald A. Griffin
*Attorney, Agent, or Firm*—Thomas & Kennedy

[57] ABSTRACT

A tunable capacitor comprises a cylindrical stator having a pair of fixed terminals and a cylindrical rotor telescopically mounted in radial alignment with the stator for rotary positionable adjustments with respect thereto. The stator has a pair of axially spaced, arcuate electrodes connected with the terminals. The rotor has an arcuate electrode that extends axially a distance sufficient to overlap at least portions of the stator electrodes in selected rotary positions with respect thereto.

13 Claims, 3 Drawing Sheets

HIGH POWER TUNABLE CAPACITOR

BACKGROUND OF THE INVENTION

Some electronic systems require the use of variable or tunable capacitors that can operate under high power conditions. Exemplary of such applications are magnetic imaging equipment and particle accelerators. Heretofore, such high power, tunable capacitors have predominantly been constructed with two sets of a number of concentric metallic cylinders nested in an air dielectric with capacitance being varied by axial displacement of one set of the cylinders with respect to the other. Exemplary of such is the capacitor shown in U.S. Pat. No. 4,459,635. With their large number of cylinders electrically connected in parallel, they inherently have had to be physically large. This consumption of space often presents serious problems to system designers. This has also rendered them heavy which has, in turn, tended to cause them to vibrate in many environments. Furthermore, their large dimensions have increased their electrical inductance.

In addition to the foregoing, the need for a large number of stator and rotor cylinders or plates, 40 being representative, has rendered high power, tunable capacitors of the prior art quite costly to manufacture. Having a large number of parts that must be assembled with precision has also rendered them unreliable. They usually have had to have one terminal movable with respect to another which has further complicated their incorporation into circuits. Their temperature coefficients have also been fixed by the use of air as their dielectric medium.

It thus is seen that a need has long existed for a high power, tunable capacitor of simpler, more economic and reliable construction. It is to the provision of such that the present invention is primarily directed.

SUMMARY OF THE INVENTION

In one form of the invention a tunable capacitor comprises a cylindrical stator that has a pair of fixed terminals. A cylindrical rotor is mounted in radial alignment with the stator for rotary adjustments with respect thereto. The stator has a pair of axially spaced, arcuate electrodes that are connected with the stator terminals. The rotor has an arcuate electrode that extends axially a distance sufficient to overlap at lesat portions of the stator electrodes in selected rotary positions of the rotor with respect to the stator.

In another preferred form of the invention, a high voltage, tunable capacitor comprises a stator that has a low loss ceramic tube and two axially spaced electrodes metalized on the exterior of the tube. The capacitor also comprises a cylindrical rotor that has a rotor electrode rotatably mounted within the stator which extends axially a distance sufficient to overlap at least portions of the stator electrodes in selected rotor positions with respect to the stator.

BRIEF DESCRIPTION OF THE DRAWING

FIG. 2A is an exploded view, in perspective, of the rotor and stator components of the capacitor illustrated in FIG. 1 while

DETAILED DESCRIPTION

Figure 1:
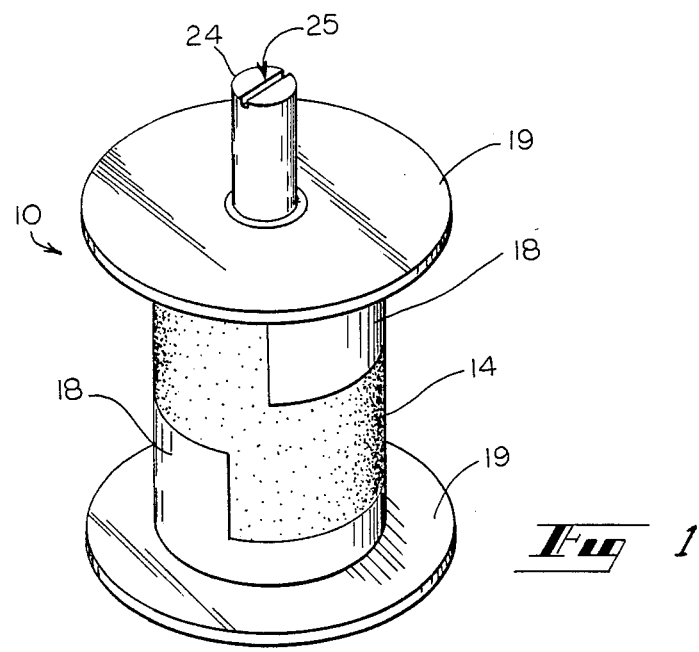
FIG. 1 is a perspective view of a high voltage tunable capacitor that embodies principles of the invention in a preferred form.
Figure 2A:
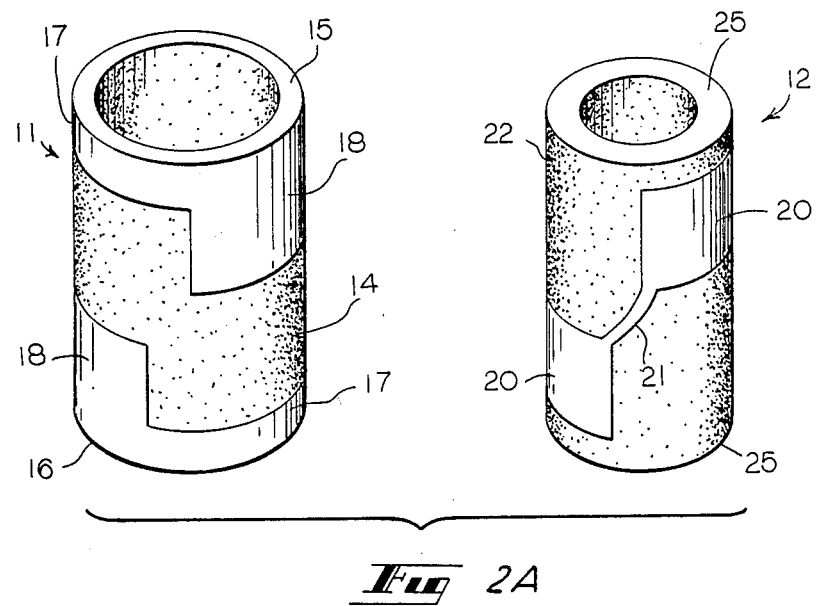
Figure 2B:
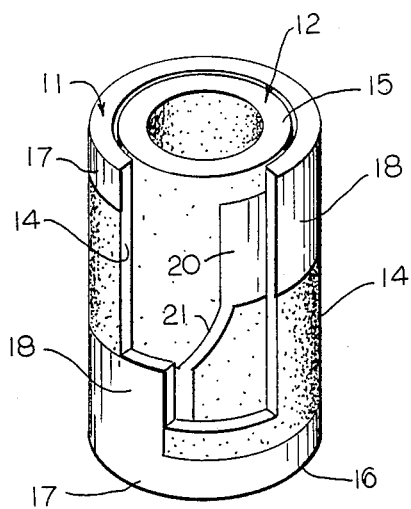
FIG. 2B is an assembled view of the rotor and stator capacitor components.

With reference next to the drawing, there is shown in FIGS. 1, 2A and 2B a high power, tunable capacitor 10 that has a stator 11 in which a rotor 12 is mounted in radial alignment with the stator. The stator is formed of a low loss, ceramic, cylindrical tube 14 having opposite ends 15 and 16. The outer cylindrical surface of the ceramic tube 14 has two metalized termination rings 17 formed thereon adjacent the ends 15 and 16. The metalized rings merge with an thus are in electrical contact with two disc-shaped terminal mounts 19 which, for clarity of illustration, are shown only in FIG. 1.

The stator 11 also has two stator electrodes 18 metalized on the outer cylindrical surface of the ceramic tube 14 which merge with the rings 17 so that they are electrically connected to the terminals 18. The two stator electrodes 18 are located diametrically opposite each other. Here, each extends 160° about the cylindrical surface of the ceramic tube 14. Since each extends 160° there are two 20° gaps, as measured circumferentially about the stator, that do not bear stator electrodes. There is also an axial gap between the two electrodes.

The rotor 12 is seen also to be formed with two rotor electrodes 20. They, however, are electrically connected by means of two metalized bridges 21. Each rotor electrode also extends 160° about the surface of a low loss, ceramic tube 22. The two rotor electrodes are axially positioned on the outer surface of the rotor dielectric tube 22 so that they can substantially underlay and be radially aligned with the two stator electrodes 18 in one rotary position of the rotor with respect to the stator. Thus the terms "overlay" and "underlay" herein have reference to radial alignment herein.

The rotor has a drive rod 24 formed with an end slot 25 in which a screwdriver or the like may be inserted for turning the drive rod. The drive rod 24 is mounted to the rotor tube 22 beneath one of the stator terminals 19 by unshown reduction gearing. The rotor 12 is hermetically sealed within the stator 11 such as, for example, by means of a sealed rotary joint like that illustrated in U.S. Pat. No. 4,459,635.

In one specific example of the capacitor 10, each rotor electrode 20 measures 0.7 inches in axial length with an 0.2 inch gap provided between the one edge of the rotor electrode 20 and a rotor end 25. Each of the stator electrodes 18 also measures 0.7 inches while the rings 17 measure 0.2 inches for an overall axial length of electrode mounting ring of 0.9 inches. The diameter of the stator tube 14 is 1.3 inches while its thickness is 0.05 inches and overall axial length is 2.2 inches. An air gap between the stator and rotor of 0.0002 inches nominal is provided.

As previously stated, the ceramic tubes should be of a low loss ceramic material. By low loss ceramic is meant that which has less than a 0.0005 dissipation factor at VHF frequencies. The metalized mounting rings and electrodes are preferably provided by an electroplated silver layer measuring 5 to 10 mils thick. With this construction a high power, tunable capacitor may be provided having a capacitance range of between 5 and 125 pf at 5 KV.

With a capacitor constructed as just described, it is seen that the rotor may be rotated within the bounds of the stator between a rotary position where the stator and rotor electrodes completely overlay each other to a rotary position where no portions of the stator and rotor electrodes are in radial alignment. Various other intermediate positions may be had where portions of the rotor electrodes are in radial alignment with portions of the stator electrodes. In this manner the capacitance may be varied by simply rotating the rotor within the stator to achieve the desired capacitance by turning the drive rod 24. Note that this is done with both terminals 19 remaining stationary by being fixedly mounted to electronic equipment into which the capacitor is incorporated. The capacitance is, of course, provided by means of the two rotor electrodes 20 being positioned adjacent the stator electrodes and with the stator tube providing the dielectric. Since each of the stator electrodes is connected to a terminal 19, and since the two rotor electrodes are directly electrically connected by bridges 21, two capacitors in series are effectively provided by the device.

Figure 3:
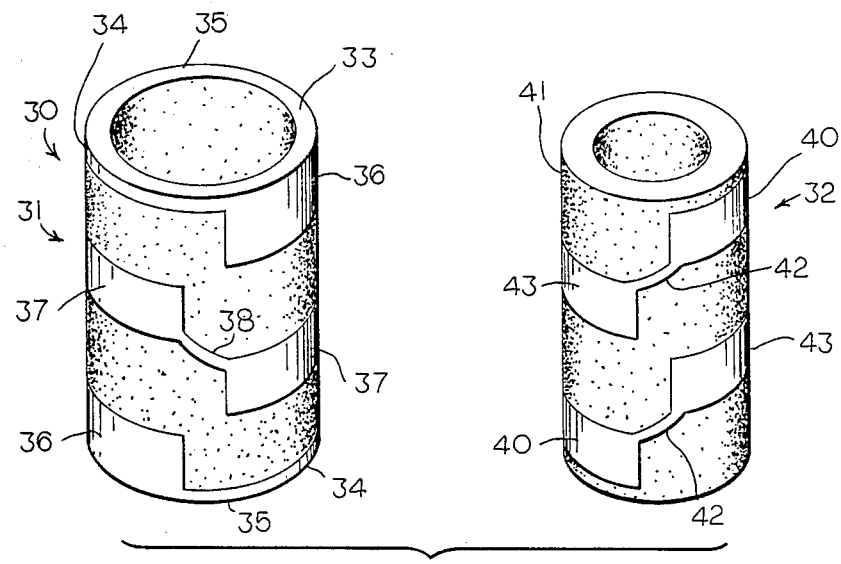
FIG. 3 is an exploded view, in perspective, of the stator and rotor components of a high voltage tunable capacitor embodying principles of the invention in an alternative form.

With reference next to FIG. 3, the rotor and stator for a high power, tunable capacitor 30 is shown in an alternative configuration. The capacitor here has a stator 31 and a rotor 32. The stator 31 again has has a tubular, cylindrical, low loss dielectric, ceramic body 33 with two metalized rings 34 formed on the outer cylindrical surface of the stator adjacent its two ends 35. The metalized rings 34 are directly connected to two disc-shaped, unshown, fixed terminals as in the previous embodiment. Here the stator has two end electrodes 36 which again extend 160° each about the outer surface of the ceramic tube. In addition, the stator has two intermediate electrodes 37 which are joined by two bridges 38. One of each of the two electrodes 37 is axially aligned with one of the end electrodes 36. All of the electrodes 36 and 37 are seen to be axially offset from one another.

The rotor 32 is seen to have two end electrodes 40 which extend 160° about the periphery of a low loss ceramic tube 41 with the two rotor electrodes 40 being located diametrically opposite each other. Each of the end electrodes 40 is connected by two bridges 42 to an intermediate rotor electrode 43 which also extends 160°. All of the rotor electrodes are seen to be axially offset from each other while each of the intermediate electrodes 43 is seen to be in radial alignment with one of the end rotor electrodes 40 to which it is not directly connected by a bridge.

The essential difference in the tunable capacitor 30 of FIG. 3 and the tunable capacitor 10 of FIGS. 1 and 2 is the fact that electrically the capacitor 30 is four rather than two serially connected capacitors that are formable by radially confronting rotor and stator electrodes with the capacitance dependent upon the specific radial position of the rotor with respect to the stator. It thus is seen that a capacitor, in accordance with the present invention, can have a number of serially connected capacitors by merely axially extending the rotor and stator and adding additional sets of rotor and stator electrodes, as illustrated.

Figure 5:
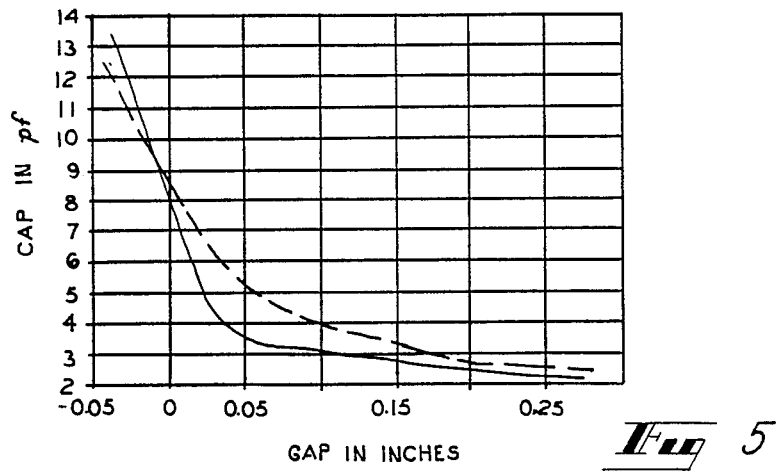
FIG. 5 is a graph with capacitance plotted against angular position of the rotor relative to the stator with regard to data generated by the embodiment illustrated in FIG. 4.
Figure 4:
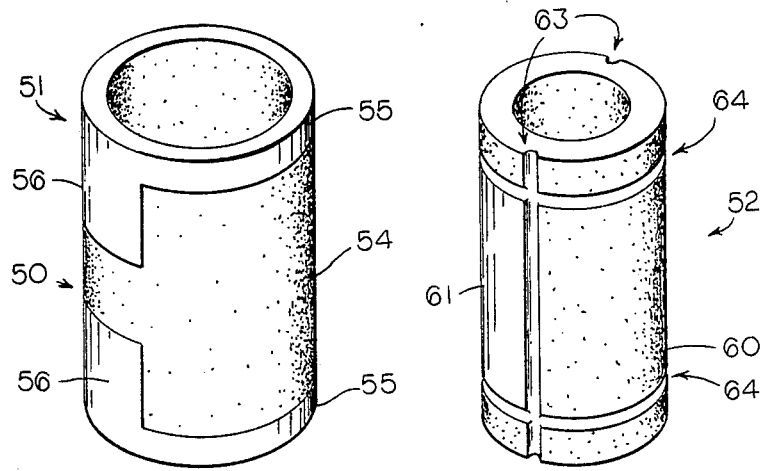
FIG. 4 is another exploded view, in perspective, of the stator and rotor components of a high power tunable capacitor embodying principles of the invention in yet another form.
Figure 6A:
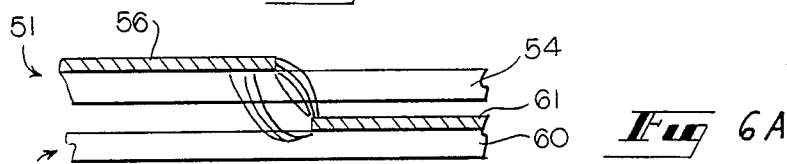
FIGS. 6A and 6B are diagrammatical views of a fragment of stator and rotor configurations used to generate the two plots shown on the graph of FIG. 5 for purposes of comparison.
Figure 6B:
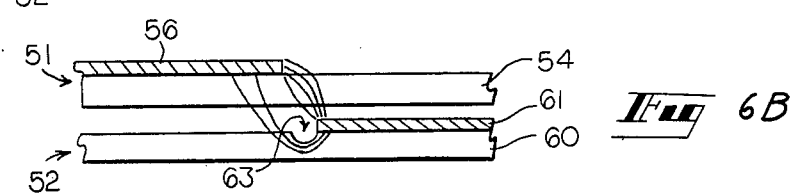

Finally, with reference to FIGS. 4, 5, and 6 a high power, tunable capacitor 50 is shown which embodies principles of the invention in yet another form. Again, only the stator and rotor components of the capacitor as shown here, it being understood that the rotor is hermetically sealed for rotation within the bounds of the stator, as in the FIG. 1 embodiment.

The tunable capacitor 50 has a stator 51 and a rotor 52 which is rotatably mounted within the bounds of the stator 51 in axial alignment therewith. The stator is formed of a cylindrical tube 54 of a low loss ceramic and has two metalized termination rings 55 formed on its outer surface adjacent its two ends. Two stator electrodes 56 are also metalized on the outer surface of the ceramic tube 54 as unitary extensions of the rings 55 so as to extend 160° about the circumference of the tube 54. In this embodiment the two stator electrodes 56 are in radial alignment and are spaced axially apart.

The rotor 52 is also seen to be comprised of a tubular, cylindrical, low loss ceramic tube 60. A single rotor electrode 61 is metalized on the outer surface of the ceramic tube 60 spaced from the two ends of the rotor. The rotor electrode 61 extends axially a distance sufficiently to overlap substantially all surface areas of the two stator electrodes 56, as well as to overlap the gap between the two stator electrodes, when the rotor is rotatably positioned in radial alignment with the two stator electrodes. Consequently, the rotor electrode 61 also extends approximately 160° about the circumference of the ceramic tube 60.

The rotor of the capacitor 50 is also seen to be formed with two grooves 63 that extend axially the entire length of the tube 60 along opposite axially-extending edges of the rotor electrode 61. The rotor also has two annular grooves 64 that extend completely about the surface of the ceramic tube 60 so as to border opposite ends of the rotor electrode 61 and to traverse the grooves 63. In this manner the entire periphery of the rotary electrode 61 is bordered by grooves formed in the surface of the otherwise cylindrical, ceramic tube 60.

With reference to FIGS. 5 and 6, the benefits provided by the grooves formed in the outer surface of the rotor bordering the rotor electrode may be appreciated. Without the grooves, as shown in FIG. 6A, capacitive coupling between the rotor electrode 61 and the stator electrodes 56 would occur as the leading ledge of the rotor electrode 61 is adjustably moved towards the edge of the stator electrode 56. As shown by the electric field lines in FIG. 6A, a substantial portion of the field extends through that portion of the dielectric rotor tube 60 located beside the electrode 61. This, of course, is because of the difference between the dielectric constant of the ceramic in comparison with that of air. By forming the rotor with the grooves 63, substantial electric coupling is prevented until the leading edge of the rotor electrode is close to radial alignment with the edge of the stator electrode. The groove thus serves to act as a barrier to coupling by effectively lengthening the path of field force lines through the rotor dielectric. This provides a sharper demarcation or cut-off as shown in FIG. 5 where the broken line is plotted with a rotor without the grooves and the solid line plotted from a capacitor having the rotor grooves. In that graph zero denotes radial edge alignment of stator and rotor electrodes, i.e. no overlay and no angular separation. To the left of the zero line some overlap occurs while to the right the converse occurs. The annular grooves 64 serve to prevent substantial coupling of the rotor electrodes with the stator terminating rings 55. If desired, grooves may also be formed on the outside of the stator bordering the stator electrodes.

It thus is now seen that a high power, tunable capacitor is provided that provides distinct advantages over those of the prior art. It should of course be understood that the just described embodiments merely illustrate preferred forms of the invention. Many modifications, additions and deletions may be made thereto without departure from the spirit and scope of the invention as set forth in the following claims.

I claim:

1. A tunable capacitor comprising a cylindrical stator having a pair of fixed terminals, a cylindrical rotor telescopically mounted in radial alignment with said stator for rotary positioned adjustments with respect thereto, said stator having a pair of axially spaced electrically isolated arcuate electrodes connected with said terminals, and said rotor having an arcuate electrode that extends axially a distance sufficient to overlap at least portions of said stator electrodes in selected rotary positions with respect to said stator.

2. The tunable capacitor of claim 1 wherein said cylindrical rotor is mounted within said cylindrical stator.

3. The tunable capacitor of claim 1 wherein said stator and said rotor each comprise a ceramic tube, and wherein said pair of arcuate stator electrodes are on the outer surface of said stator ceramic tube and wherein said arcuate rotor electrode is on the outer surface of said rotor ceramic tube.

4. The tunable capacitor of claim 3 wherein said rotor ceramic tube is formed with grooves that border at least a portion of said rotor electrode.

5. The tunable capacitor of claim 4 wherein said grooves border substantially the entire periphery of said rotor electrode.

6. The tunable capacitor of claim 1 wherein said pair of stator electrodes are angularly spaced from each other and wherein said rotor electrode has two angularly spaced sections connected by a bridging section.

7. The tunable capacitor of claim 1 wherein said pair of stator electrodes are angularly aligned with each other and wherein said stator electrode has two axially extending sides.

8. The tunable capacitor of claim 1 wherein said stator has three axially spaced arcuate electrodes and wherein said rotor has two axially spaced electrodes with each rotor electrode extending axially a distance sufficient to overlap two different sets of said stator electrodes.

9. A high voltage tunable capacitor comprising a stator having a low loss ceramic tube and two axially spaced electrically isolated electrodes metalized on the exterior of said tube, and a cylindrical rotor rotatably mounted within said stator and having an electrode that extends axially a distance sufficient to overlap at least portions of said stator electrodes in selected rotary positions of said rotor with respect to said stator.

10. The high voltage capacitor of claim 9 wherein said stator has two terminals to each one of which one of said two stator electrodes are directly electrically connected.

11. The high voltage capacitor of claim 9 wherein said cylindrical rotor comprises a ceramic cylinder upon the outer surface of which said rotor electrode is metalized.

12. The high voltage capacitor of claim 11 wherein said rotor ceramic cylinder is formed with grooves that border at least a portion of said rotor electrode.

13. The high voltage tunable capacitor of claim 9 wherein said stator has three axially spaced arcuate electrodes and wherein said rotor has two axially spaced electrodes with each rotor electrode extending axially a distance sufficient to overlap the different sets of said stator electrodes.

* * * * *